US011918544B2

(12) United States Patent
Massey

(10) Patent No.: US 11,918,544 B2
(45) Date of Patent: Mar. 5, 2024

(54) FOOD STORAGE SYSTEM

(71) Applicant: Brian Massey, Frisco, TX (US)

(72) Inventor: Brian Massey, Frisco, TX (US)

( * ) Notice: Subject to any disclaimer, the term of this patent is extended or adjusted under 35 U.S.C. 154(b) by 0 days.

(21) Appl. No.: 17/307,732

(22) Filed: May 4, 2021

(65) Prior Publication Data

US 2021/0338534 A1 Nov. 4, 2021

Related U.S. Application Data

(60) Provisional application No. 63/019,881, filed on May 4, 2020.

(51) Int. Cl.
*A61J 19/00* (2006.01)

(52) U.S. Cl.
CPC .................................... *A61J 19/00* (2013.01)

(58) Field of Classification Search
CPC ....................................................... A61J 19/00
USPC ............................................................... 4/271
See application file for complete search history.

(56) References Cited

U.S. PATENT DOCUMENTS 2,757,859 A 8/1956 Holland
3,798,682 A 3/1974 Harreld
4,162,547 A 7/1979 Jenkins
4,503,572 A * 3/1985 Dawson .................. A61J 19/00 D7/700
4,628,547 A 12/1986 Baker
4,885,809 A 12/1989 Muchmore
5,325,546 A 7/1994 Setliff
5,832,543 A 11/1998 Bosserman
6,266,829 B1 7/2001 Schmidt
6,305,033 B1 10/2001 Azzam
6,507,957 B1 1/2003 Ingram
6,665,887 B2 12/2003 Nguyen
6,718,563 B1 4/2004 Kreiensieck
6,901,976 B1 6/2005 Bautista et al.
7,739,755 B2 6/2010 Taras
D705,058 S * 5/2014 Kim ............................... D9/454
9,603,471 B2 3/2017 Green
9,724,273 B2 8/2017 Brown
10,052,265 B1 8/2018 Duffer et al.
11,160,732 B2 * 11/2021 Ross ....................... A61J 19/02
2006/0101564 A1 5/2006 Powdermaker
2009/0266828 A1 * 10/2009 Cai .................... B65D 43/0212 220/712
2013/0020338 A1 * 1/2013 French ................... B65D 47/40 220/713
2015/0166254 A1 6/2015 Omoko
2016/0243006 A1 8/2016 Nesmith
(Continued)

OTHER PUBLICATIONS

International Search Report and Written Opinion for PCT/US2021/030672, Filed on May 4, 2021, dated Jul. 6, 2021, 13 pages.

*Primary Examiner* — Huyen D Le
(74) *Attorney, Agent, or Firm* — Ferguson Braswell Fraser Kubasta PC

(57) ABSTRACT

An apparatus implements a food storage system. The apparatus includes a lid and a cup. An opening in the lid is structured to pass material, expelled from a mouth of a user of the apparatus, to the cup. A first flange on a first side of the lid protrudes up from the lid. A second flange on a second side of the lid protrudes up from the lid. The second side is opposite the first side. A lip rest is between the first flange and the second flange.

17 Claims, 16 Drawing Sheets

(56) References Cited

U.S. PATENT DOCUMENTS

| | | | | |
|---|---|---|---|---|
| 2016/0345762 | A1 | 12/2016 | Brannock | |
| 2017/0128327 | A1* | 5/2017 | Riley | A61J 19/00 |
| 2019/0083362 | A1 | 3/2019 | Hales | |

* cited by examiner

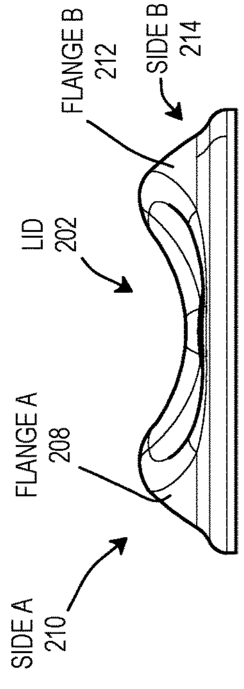
FIGURE 2.1
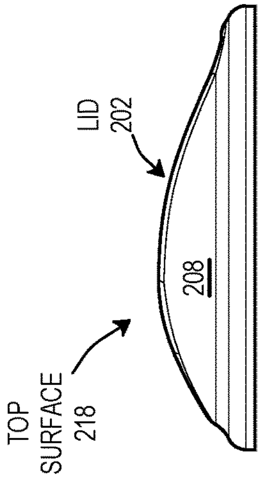
FIGURE 2.2
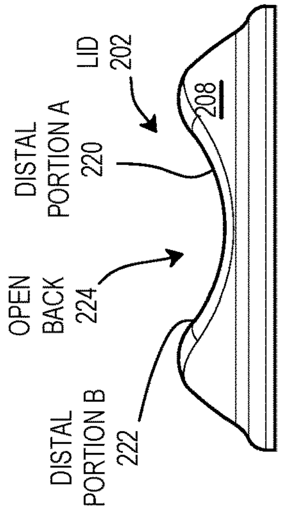
FIGURE 2.3
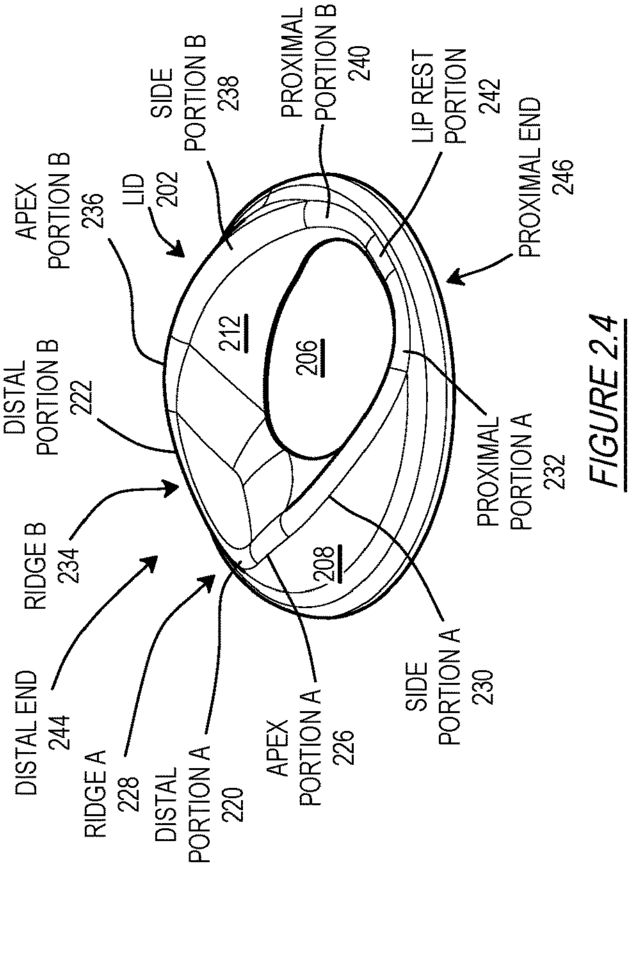
FIGURE 2.4
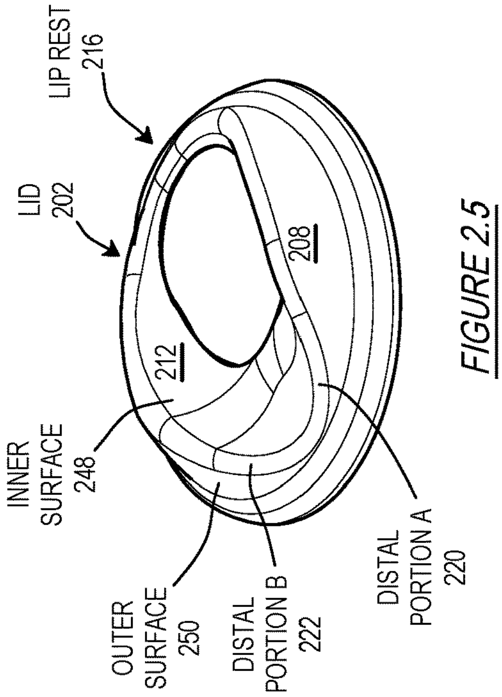
FIGURE 2.5

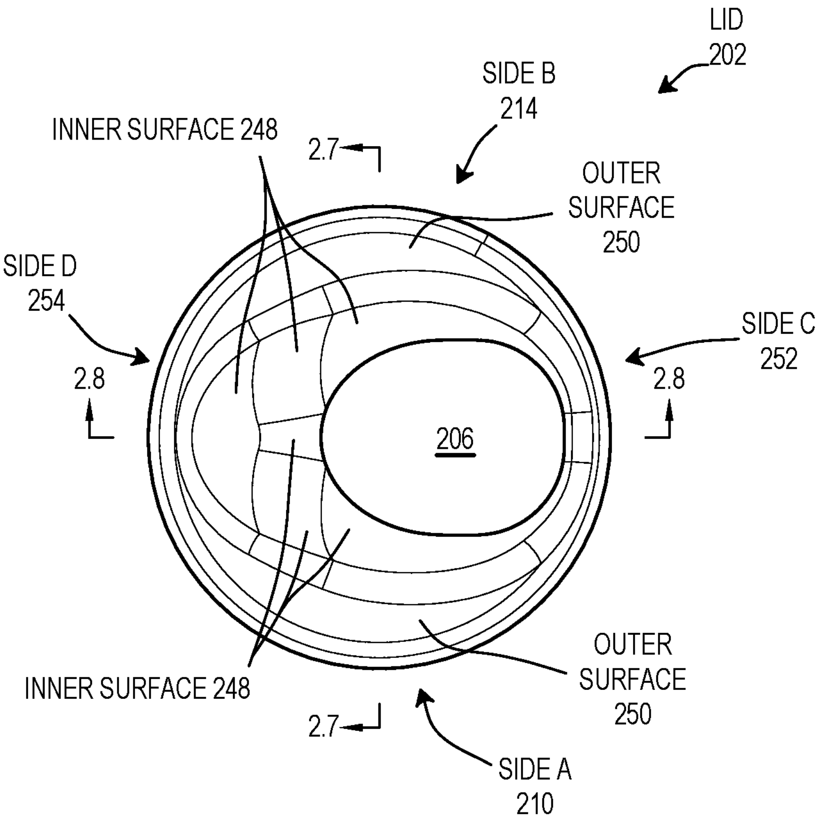
FIGURE 2.6
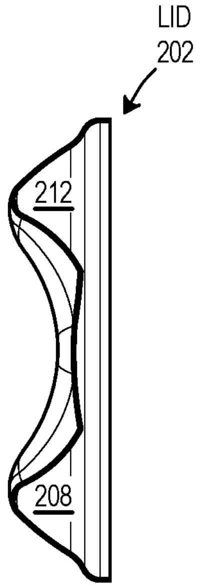
FIGURE 2.7
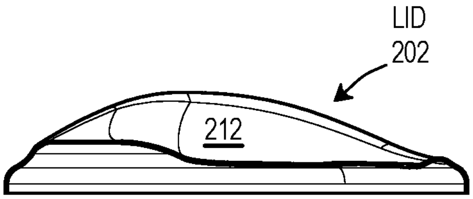
FIGURE 2.8

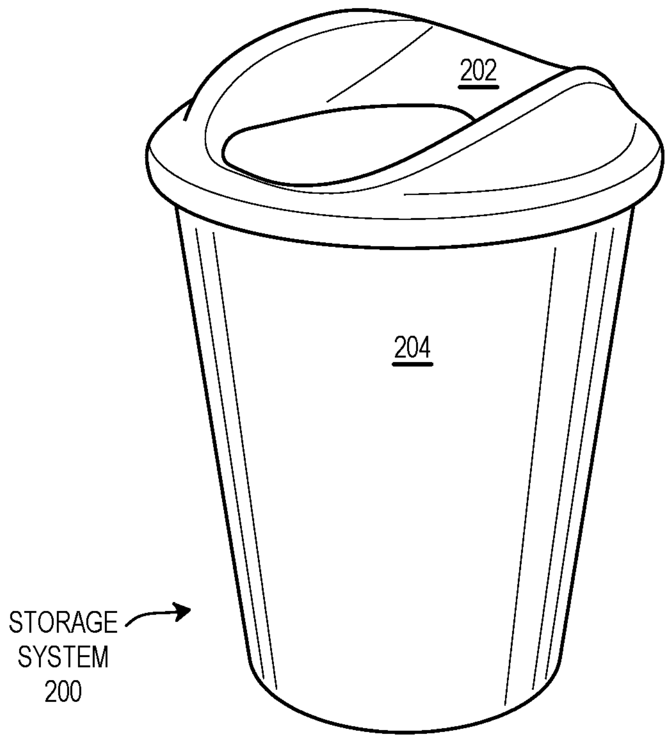
FIGURE 2.9
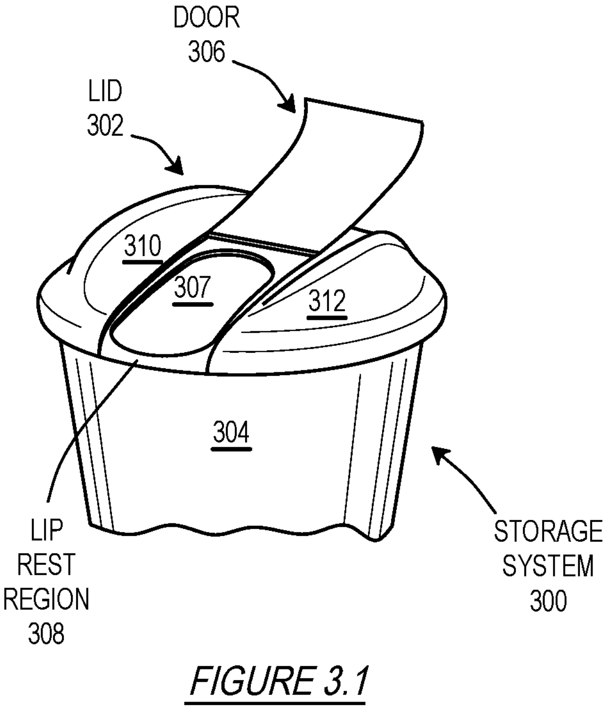
FIGURE 3.1
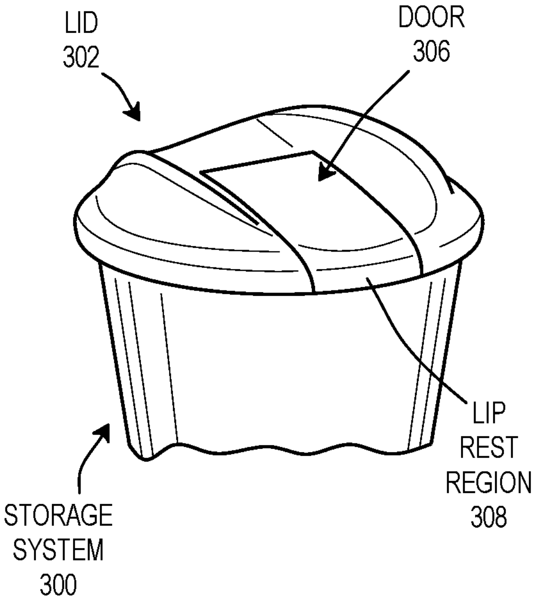
FIGURE 3.2

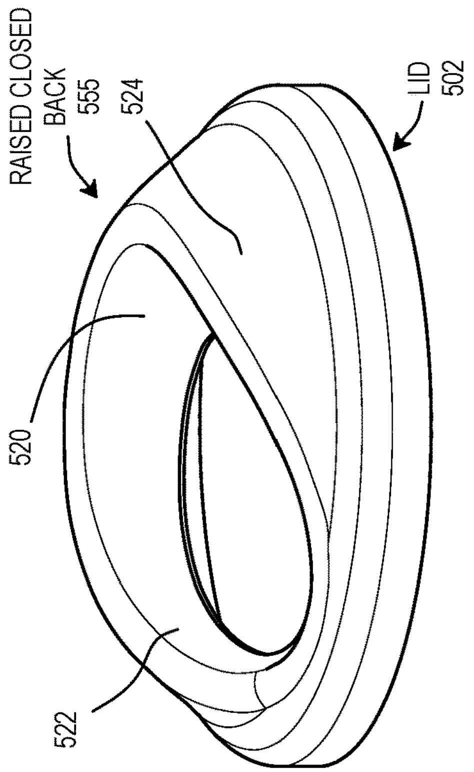
FIGURE 5.1
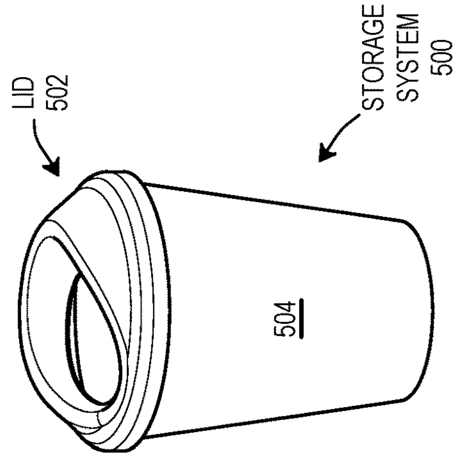
FIGURE 5.2
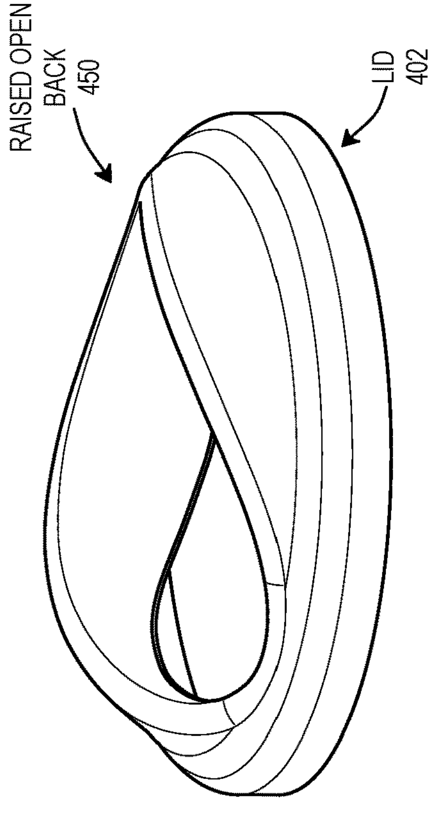
FIGURE 4.1
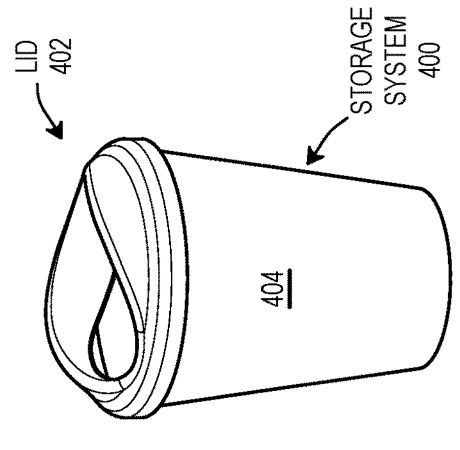
FIGURE 4.2

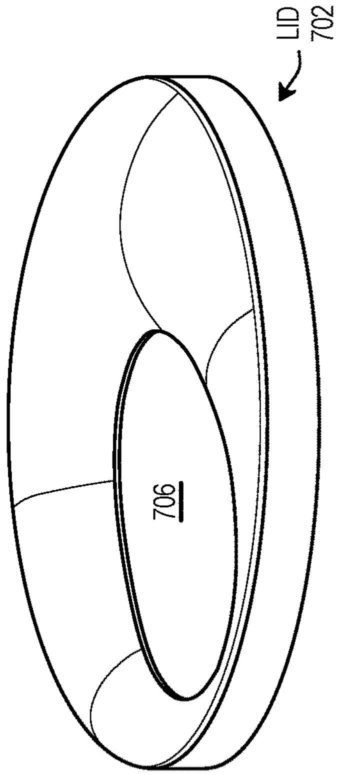
FIGURE 7.1
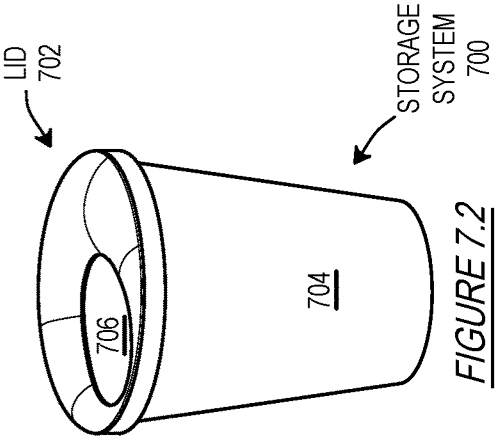
FIGURE 7.2
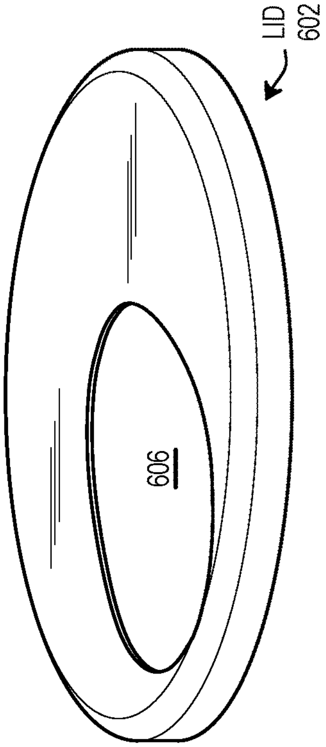
FIGURE 6.1
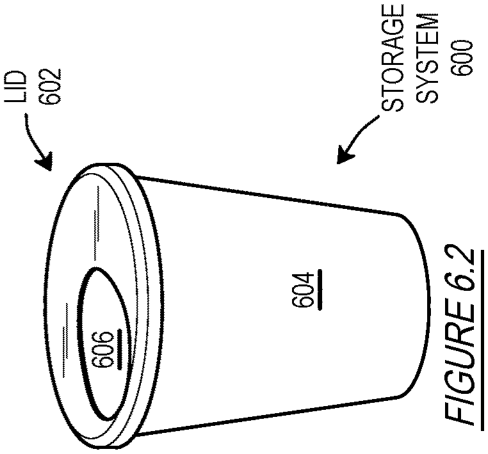
FIGURE 6.2

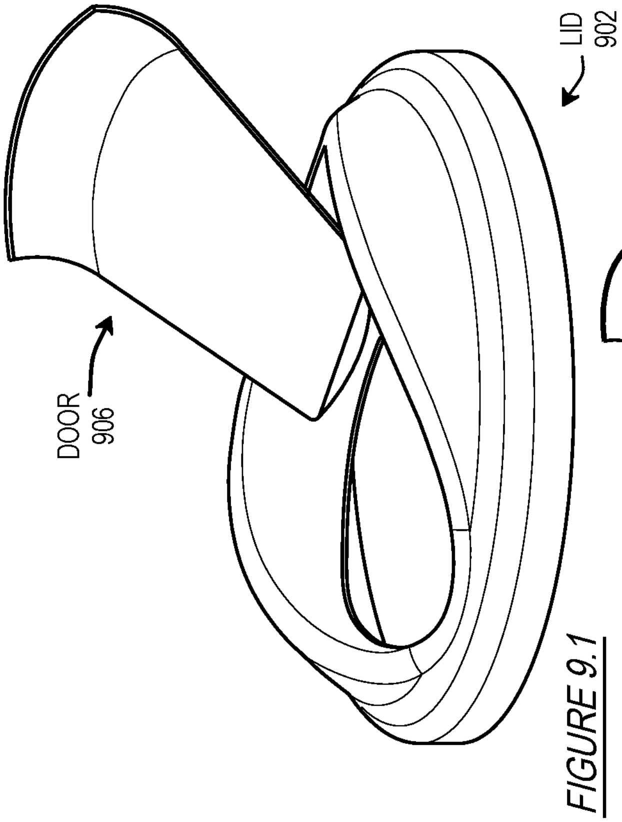
FIGURE 9.1
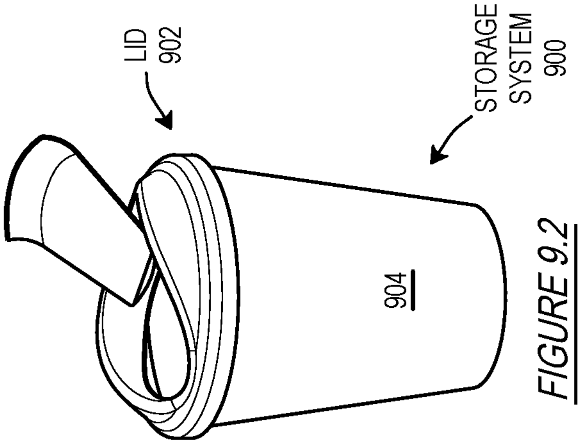
FIGURE 9.2
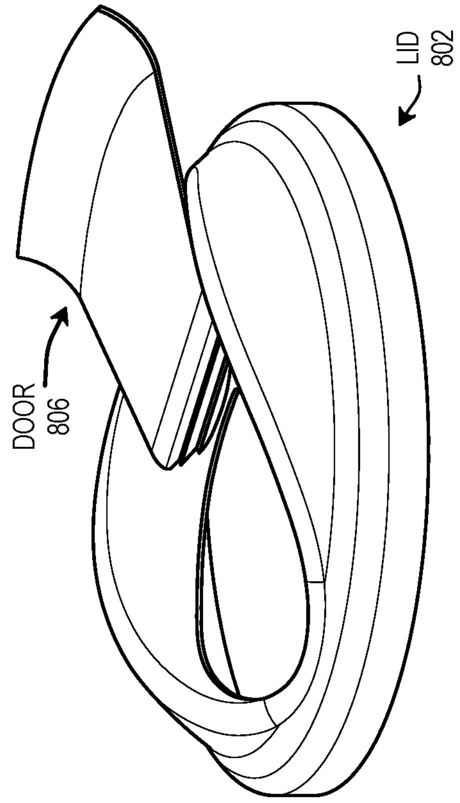
FIGURE 8.1
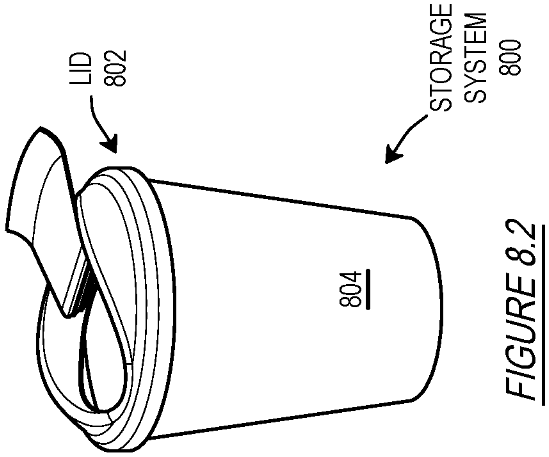
FIGURE 8.2

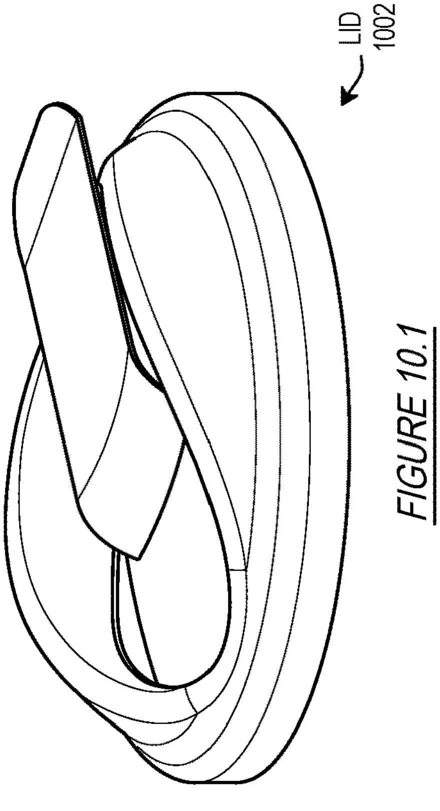
FIGURE 10.1
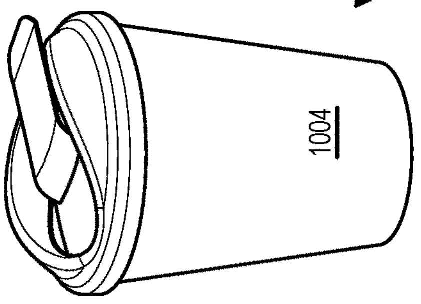
FIGURE 10.2
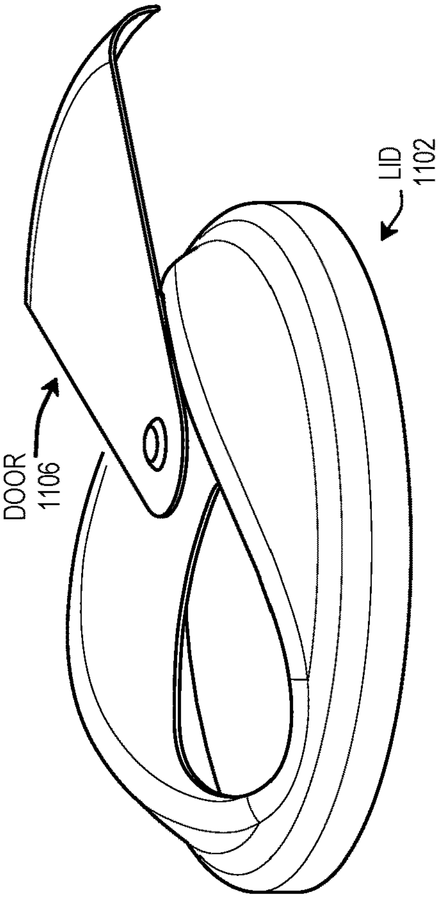
FIGURE 11.1
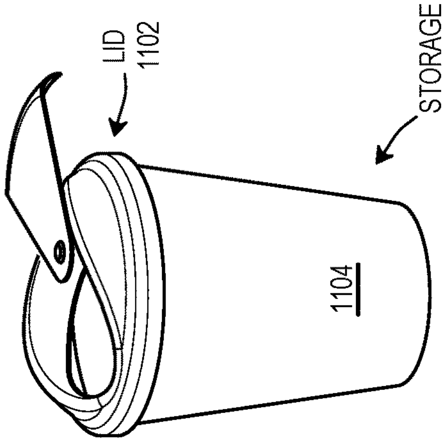
FIGURE 11.2

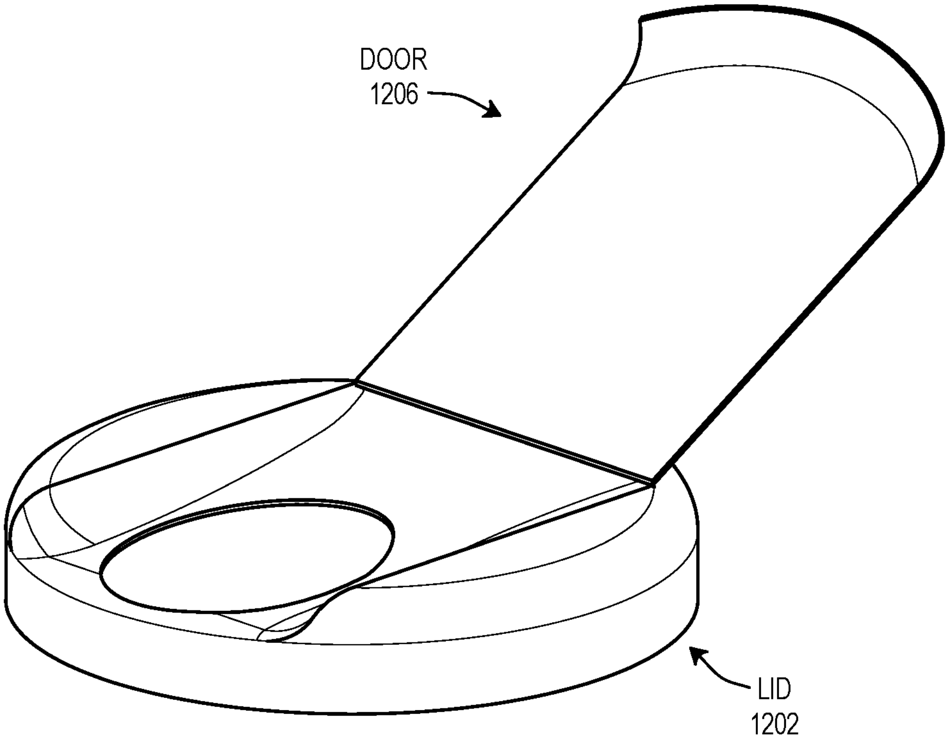
FIGURE 12.1
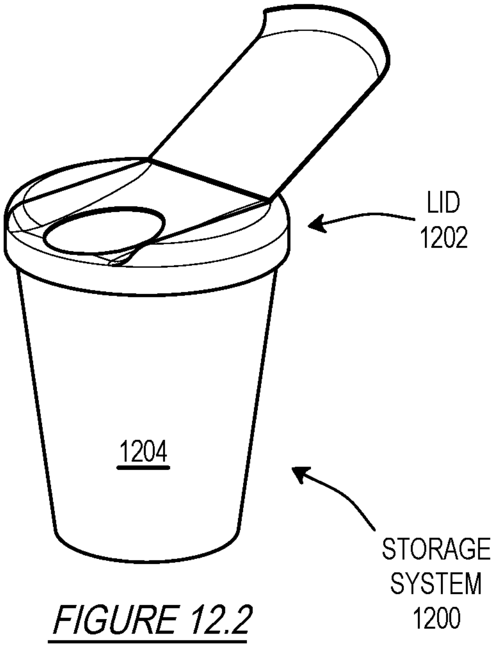
FIGURE 12.2

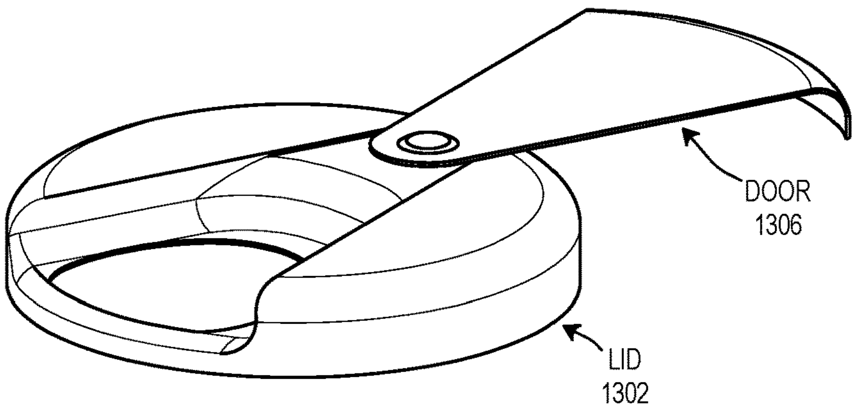
FIGURE 13.1
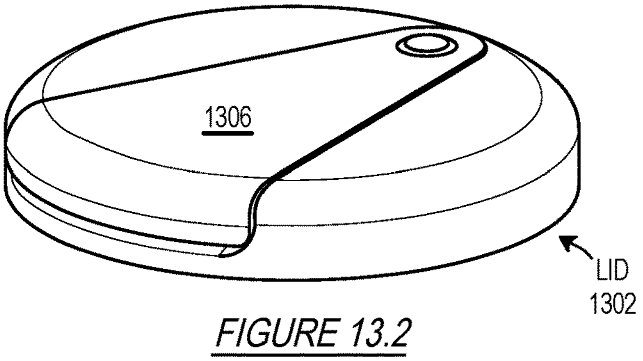
FIGURE 13.2
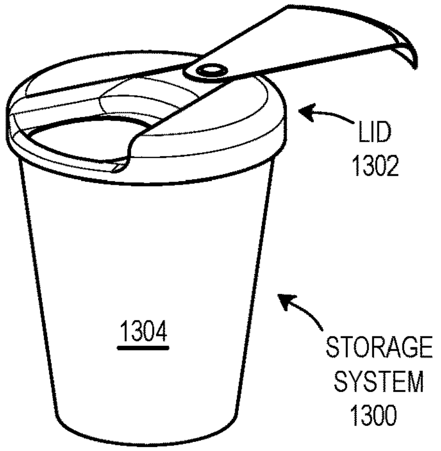
FIGURE 13.3

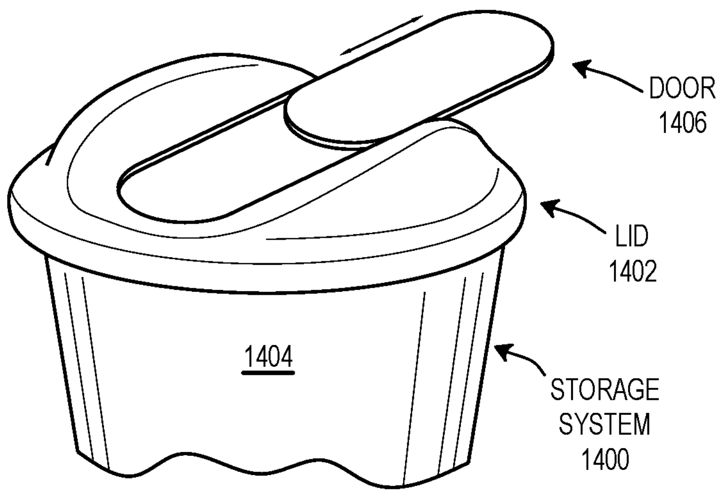
FIGURE 14
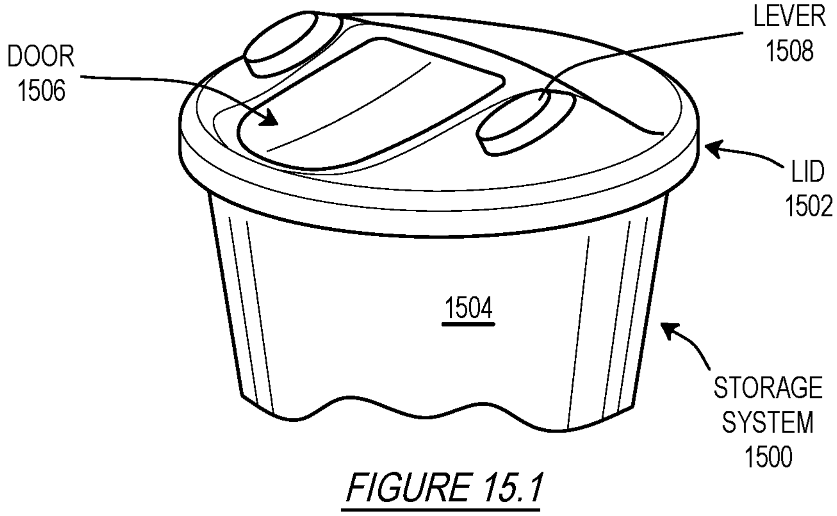
FIGURE 15.1
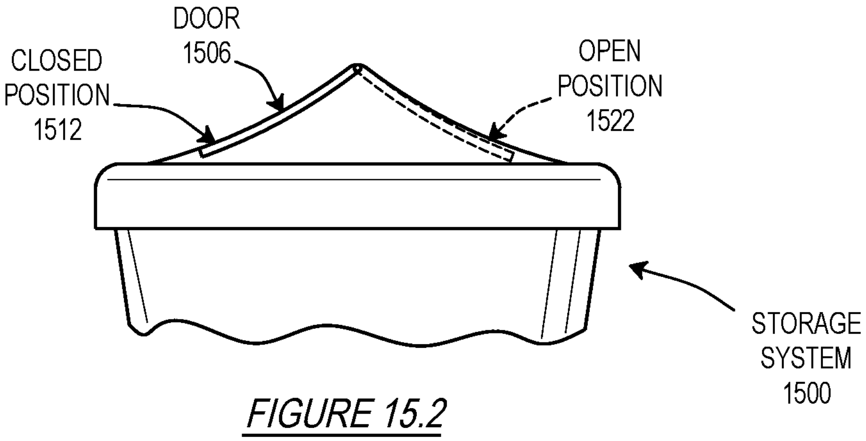
FIGURE 15.2

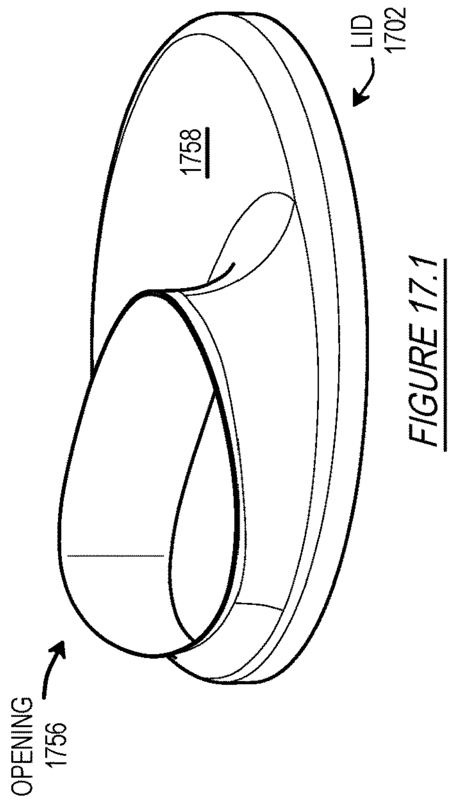
FIGURE 17.1
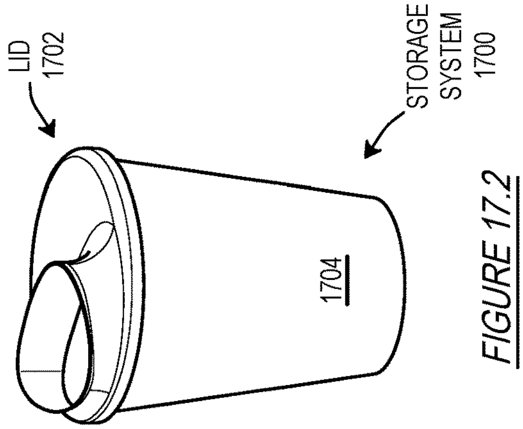
FIGURE 17.2
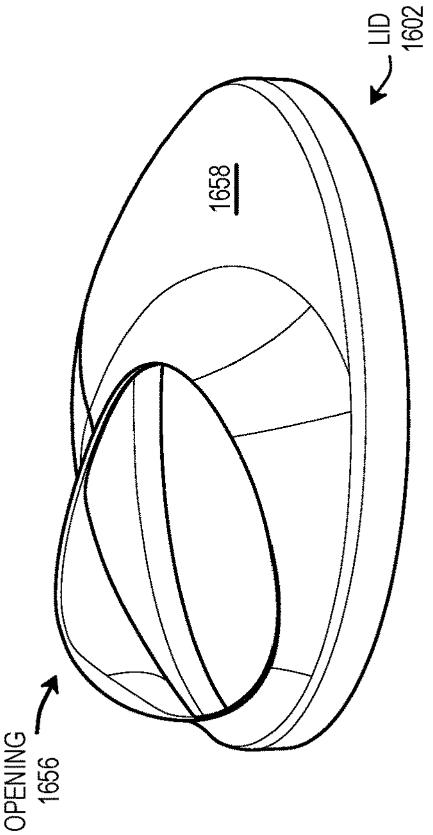
FIGURE 16.1
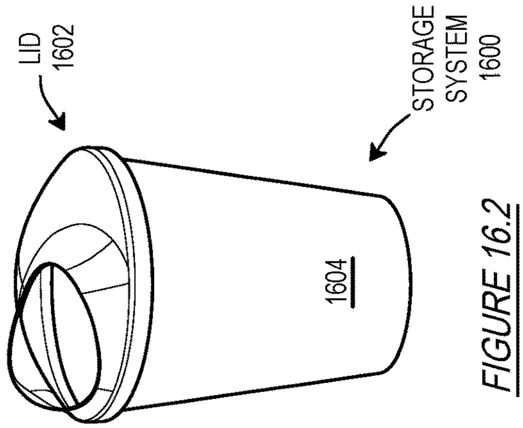
FIGURE 16.2

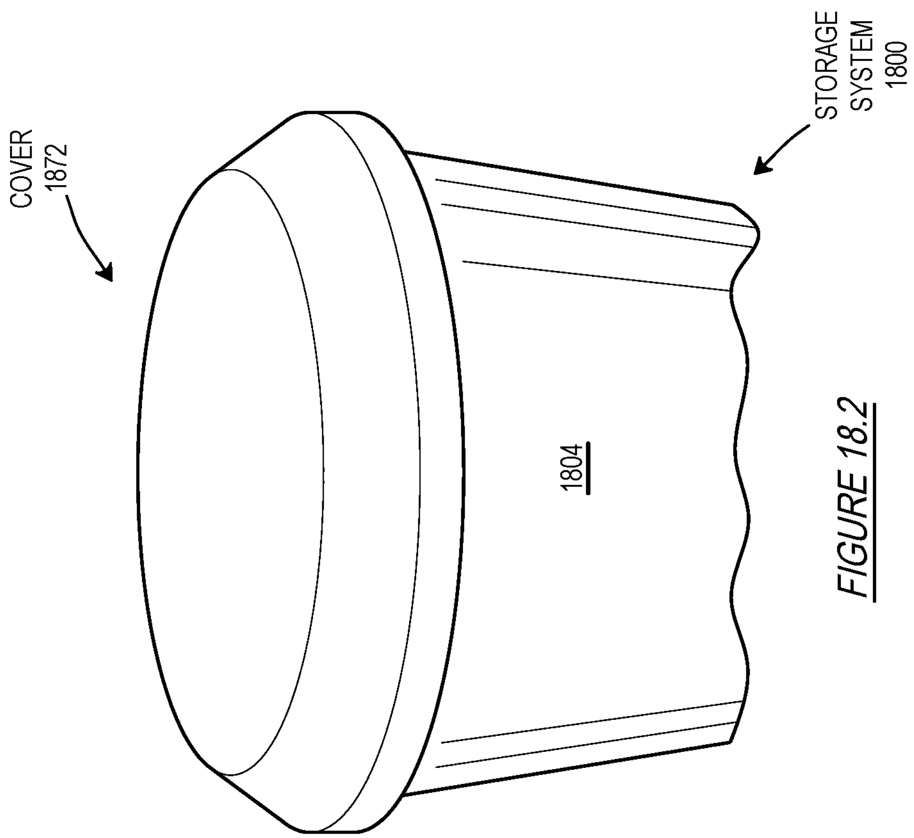
FIGURE 18.2
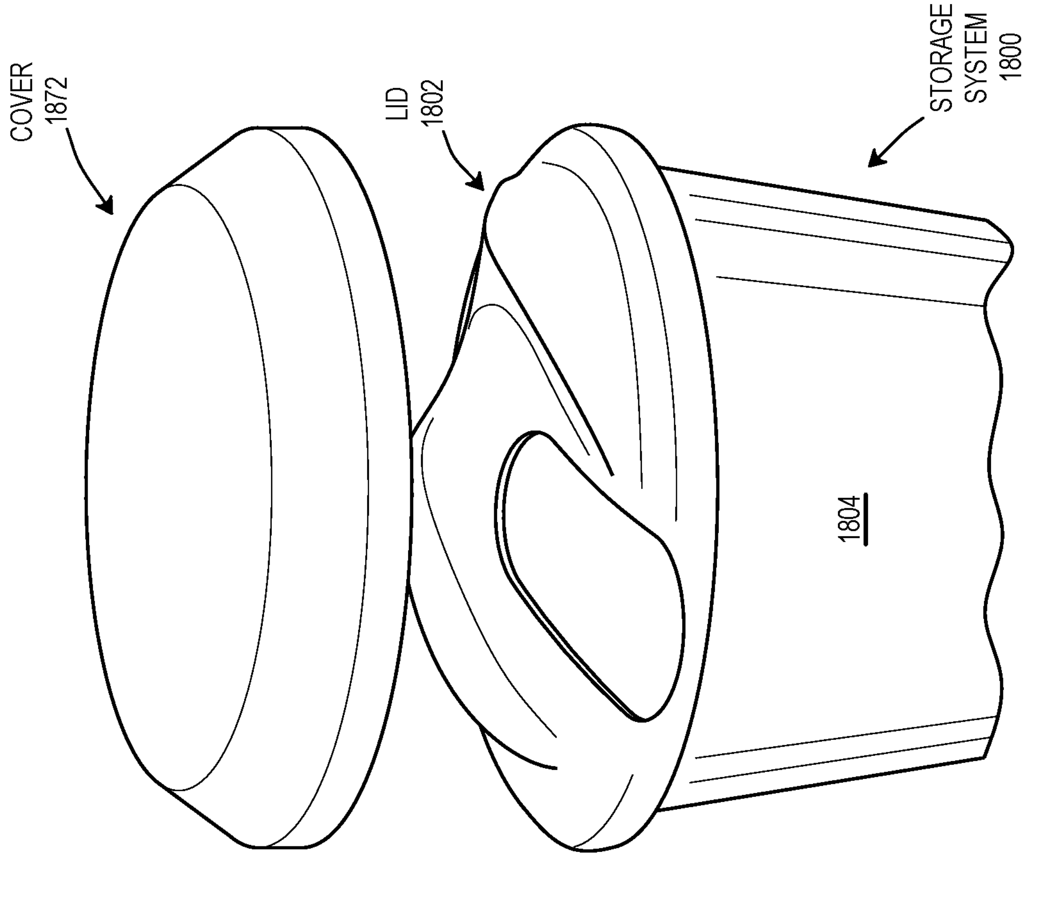
FIGURE 18.1

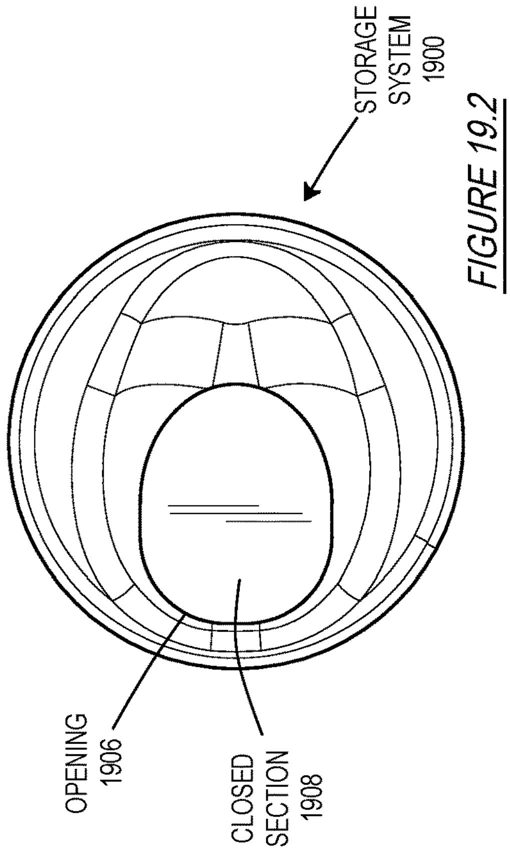
FIGURE 19.2
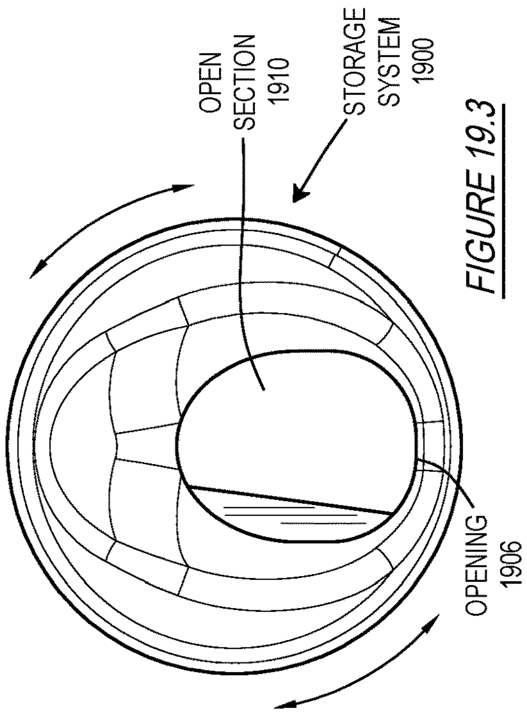
FIGURE 19.3
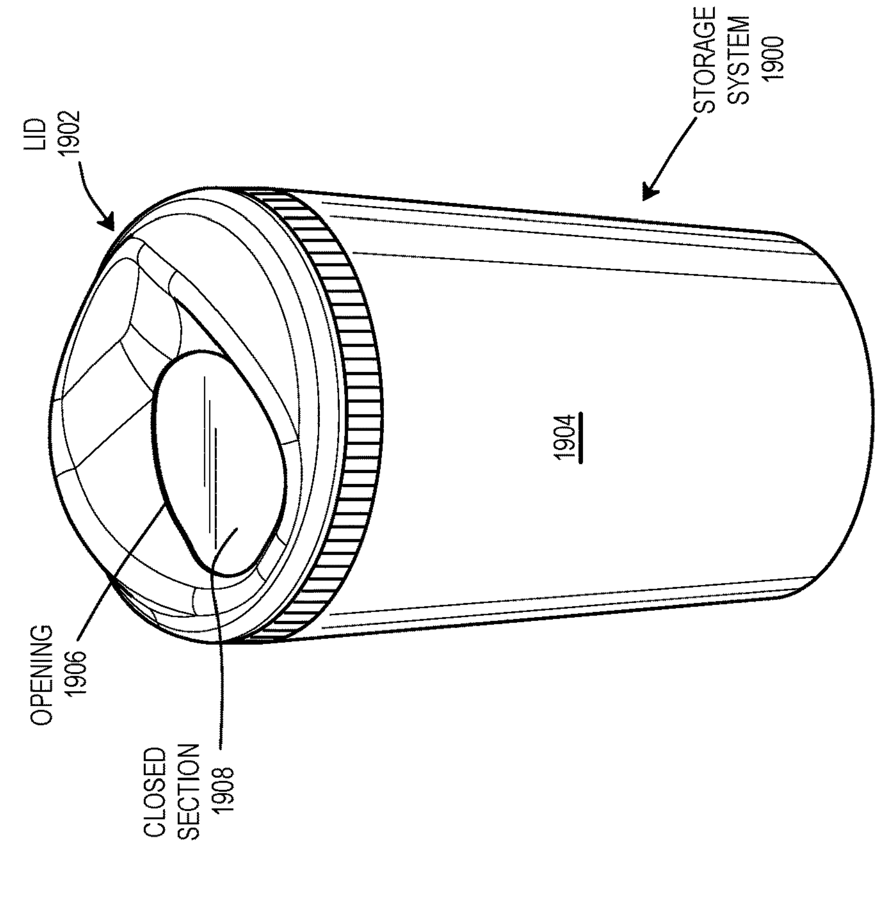
FIGURE 19.1

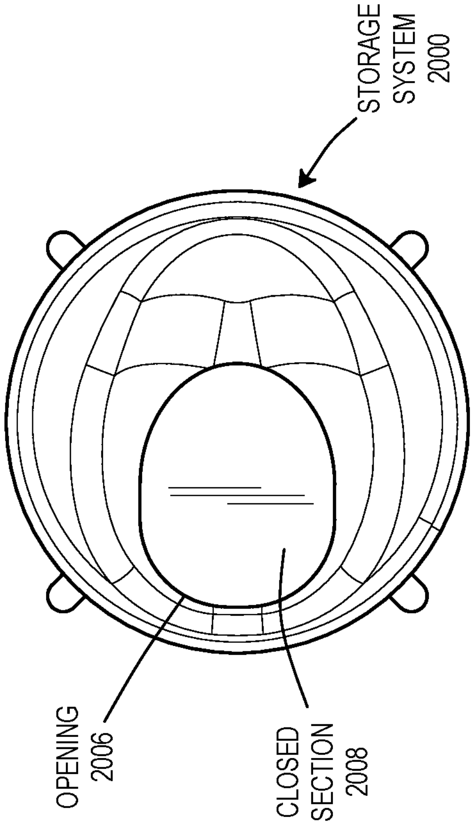
FIGURE 20.2
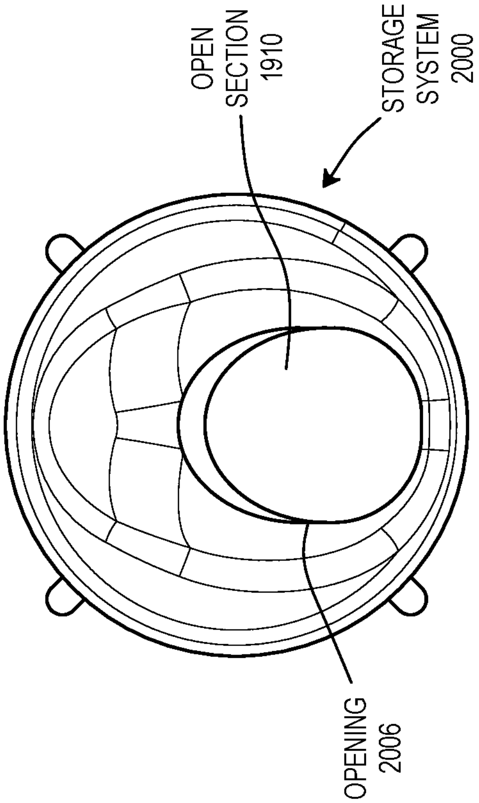
FIGURE 20.3
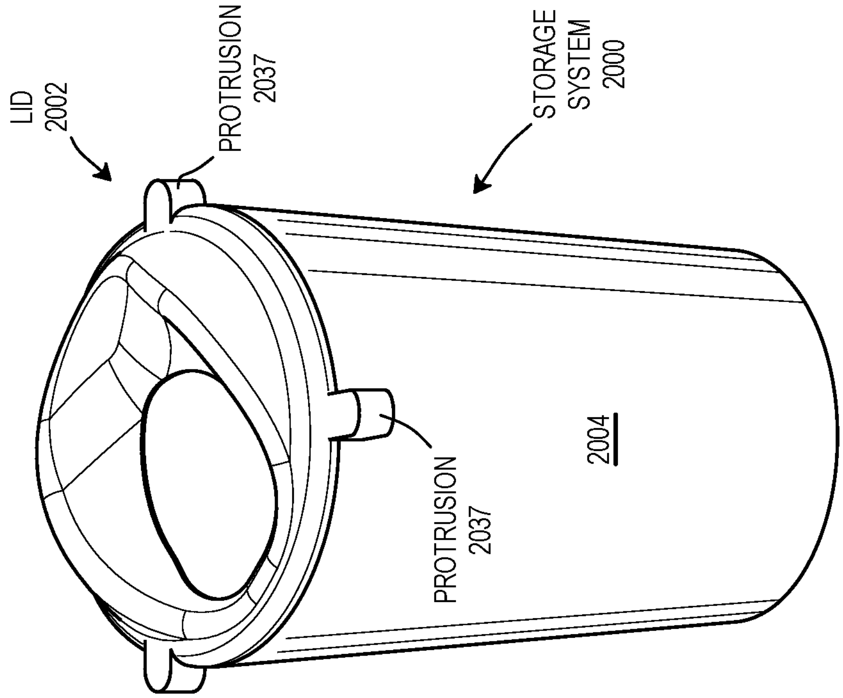
FIGURE 20.1

FOOD STORAGE SYSTEM

CROSS REFERENCE TO RELATED APPLICATIONS

This application claims the benefit of U.S. Provisional Application 63/019,881 filed May 4, 2020, which is incorporated by reference herein.

COPYRIGHT NOTICE

The disclosures in this document are subject to copyright and intended for the express and sole purpose of compliance with US and International patent laws. A portion of the disclosure of this document contains material which is subject to copyright protection. The copyright owner has no objection to facsimile reproduction by anyone of the patent document or the patent disclosure as it appears in the Patent & Trademark Office patent file or records but otherwise reserves all copyright rights whatsoever.

BACKGROUND

With society evolving into more sedentary modalities with virtually unlimited food options and availability, the human body is ill equipped, in terms of long term health, to deal with the pace and impacts of these trends. This has led to record levels of chronic obesity and disease in society.

SUMMARY

In general, in one or more aspects, the disclosure relates to an apparatus implements a food storage system. The apparatus includes a lid and a cup. An opening in the lid is structured to pass material, expelled from a mouth of a user of the apparatus, to the cup. A first flange on a first side of the lid protrudes up from the lid. A second flange on a second side of the lid protrudes up from the lid. The second side is opposite the first side. A lip rest is between the first flange and the second flange.

Other aspects of the disclosure will be apparent from the following description and the appended claims.

BRIEF DESCRIPTION OF DRAWINGS

FIG. 2.1, FIG. 2.2, FIG. 2.3, FIG. 2.4, FIG. 2.5, FIG. 2.6, FIG. 2.7, FIG. 2.8, and FIG. 2.9 show an example of a storage system in accordance with the disclosure.

FIG. 3.1 and FIG. 3.2 show an example of a storage system in accordance with the disclosure.

FIG. 4.1 and FIG. 4.2 show an example of a storage system in accordance with the disclosure.

FIG. 5.1 and FIG. 5.2 show an example of a storage system in accordance with the disclosure.

FIG. 6.1 and FIG. 6.2 show an example of a storage system in accordance with the disclosure.

FIG. 7.1 and FIG. 7.2 show an example of a storage system in accordance with the disclosure.

FIG. 8.1 and FIG. 8.2 show an example of a storage system in accordance with the disclosure.

FIG. 9.1 and FIG. 9.2 show an example of a storage system in accordance with the disclosure.

FIG. 10.1 and FIG. 10.2 show an example of a storage system in accordance with the disclosure.

FIG. 11.1 and FIG. 11.2 show an example of a storage system in accordance with the disclosure.

FIG. 12.1 and FIG. 12.2 show an example of a storage system in accordance with the disclosure.

FIG. 13.1, FIG. 13.2, and FIG. 13.3 show an example of a storage system in accordance with the disclosure.

FIG. 14 shows an example of a storage system in accordance with the disclosure.

FIG. 15.1 and FIG. 15.2 show an example of a storage system in accordance with the disclosure.

FIG. 15.1 and FIG. 15.2 show an example of a storage system in accordance with the disclosure.

FIG. 16.1 and FIG. 16.2 show an example of a storage system in accordance with the disclosure.

FIG. 17.1 and FIG. 17.2 show an example of a storage system in accordance with the disclosure.

FIG. 18.1 and FIG. 18.2 show an example of a storage system in accordance with the disclosure.

FIG. 19.1, FIG. 19.2, and FIG. 19.3 show an example of a storage system in accordance with the disclosure.

FIG. 20.1, FIG. 20.2, and FIG. 20.3 show an example of a storage system in accordance with the disclosure.

DETAILED DESCRIPTION

Figure 1:
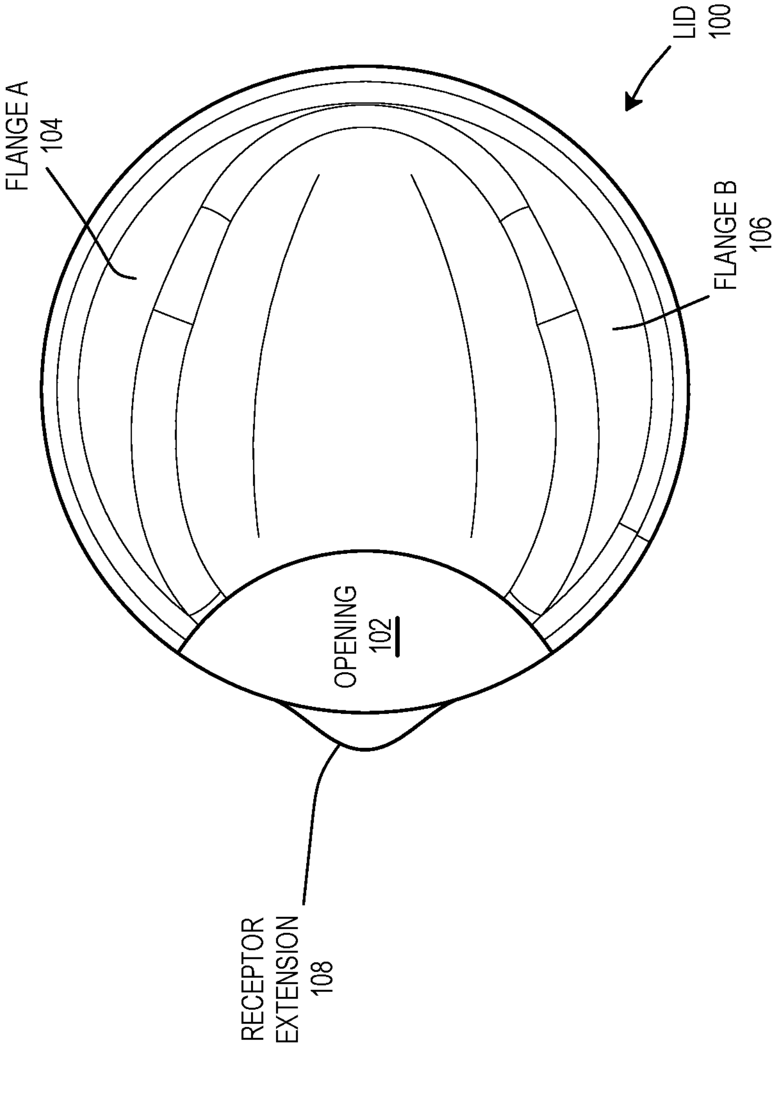
FIG. 1 shows an example of a lid of a storage system in accordance with the disclosure.

Specific embodiments will now be described in detail with reference to the accompanying figures. Like elements in the various figures are denoted by like reference numerals for consistency.

In the following detailed description of embodiments of the technology, numerous specific details are set forth in order to provide a more thorough understanding. However, it will be apparent to one of ordinary skill in the art that various embodiments may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to be a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

With society evolving into more sedentary modalities with virtually unlimited food options and availability, the human body is ill equipped, in terms of long term health, to deal with the pace and impacts of these trends. This has led to record levels of chronic obesity and disease in society. The methods, techniques, and apparatuses described herein can help people adapt to these trends in a socially acceptable and convenient way.

In general, storage systems of the disclosure include several elements to enhance the disposal of food material from a mouth of a user. Privacy is enhanced with the use of flanges. The flanges may be vertical, circular, semi-circular, etc., and prevent others from seeing the expulsion of material to the cup. Cleanliness is enhanced with the lip rest, having a slippery surface inside the cup part of the storage system (e.g., the inner walls of the cup) and a sealing mechanism. The lip rest may be structured for the bottom lip of the user to rest on the lip rest while material is expelled over the lip and lip rest into the cup of the storage system. The expelled material may be further obscured with a door that is biased to stay closed and having a dark interior to the cup part of the storage system. The storage system may be used in a one-handed fashion. The opening to the lid is larger than the openings of lids for other cups to allow the storage system to receive material from the mouth of the user as opposed to dispensing liquid.

The storage system may be disposable (i.e., "single use") or non-disposable. Durable lids for the non-disposable versions have more intricate sealing and opening mechanisms as allowed by the durable materials, which may have increased thickness and rigidity as compared to the disposable versions.

Use of the storage system mimics the process of drinking out of a cup. The open back version of the storage system allows a steeper angle of the cup to the face of the user as though someone were taking a drink. The steeper angle allows for better delivery of food material through the lid to the cup.

For the purposes of this disclosure, the following terms are used:

partially ingested—food that has been inserted into mouth, chewed or tasted but not yet swallowed.

bolus—a mass of chewed food in the mouth ready to be swallowed.

food—food or beverage in a for that is whole, liquid, frozen, masticated, etc. that has been chewed or placed in mouth.

expelled food—food that has been masticated or placed in the mouth and is ejected from the mouth (e.g., spit out, ejected)

food material—food or liquid of any sort in any state of masticated, pre-digestion in any form be it solid, liquid, frozen or any form in between.

Embodiments described herein provide methods, techniques, and systems for the collection, storage, and disposal of partially ingested food material. Example embodiments provide a food storage and disposal packaging system ("FSDPS") (also referred to as a disposal system or a storage system), which enables users to expel food that has been placed in the users mouth (without swallowing) before the user swallows the food. This allows the user to taste the food without actual consumption that is converted to the body' s energy—hence before the food becomes part of caloric intake. The storage systems described herein provides a collection, storage, and disposal package (or packaging system), that allows an end user to discretely expel the food, store the food in an odor minimizing (or odorless manner) for later disposal. Additionally, embodiments of the disclosure may be used as a storage system to store and then deliver food to the mouth of the user.

For the purposes of this disclosure, as noted above, food comprises any solid or liquid "food" or beverage that can be placed in mouth and expelled (e.g., spit, expectorated, spewed out, etc.) prior to swallowing. Example storage systems provide a storage facility (i.e., a "cup" or holder) and a lid system for receiving (not dispensing) partially ingested, masticated or tasted (not swallowed) food material in various solid states (liquid, solid, frozen or any state in between) for the purpose of conveniently and discretely sealing, storing and disposing of the food material. For the purpose of this disclosure, the term "cup" refers to a container system typically held in an adult sized hand (but not limited to an adult hand) with a shape that may be cylindrical. Other forms, including rectangular shapes, may be used. In example devices, the cup is sealed, enclosed or encased on the bottom and sides but not the top. The term "lid" refers to a covering system designed to cover the cup opening (however shaped) at one end—typically, the top. The design of the lid is configured to discretely accept (i.e., not dispense) masticated food into the cup from a user's mouth for further disposal. The cup and lid system (the storage system or packaging system) work together to allow the user a way to discretely dispose of food or liquid in the mouth prior to swallowing and then dispose of the effluent food material in a safe and effective manner.

An example storage system includes a storage facility (a cup) and a lid. The lid may be a cylindrical shape with enclosed sides and bottom and opening at the top to accept food material for collection. Unlike cups that are designed to dispense food or liquid materiel, cups according to the disclosure are designed to receive, store (collect, save, etc.) and facilitate disposal of food material. The cup can receive both food solids and liquids. The cup may be constructed (configured or structured) from one or a plurality of materials that can include but is not limited to plastic, types of cardboard, glass, steel or any material suitable for physical retention of food or liquid solid in any form or state (i.e., liquid, solids, frozen or any state in between).

The lid of the storage system may be constructed of a variety of materials as well. The lid may sit on top of or inside the cup or is attached to the opening of the cup and accepts and hides food material deposited by the user into the cup. In one example storage system, the lid contains an opening with a rounded shape, the size of which may be about half the cross sectional area of the cup. There is a cover mechanism that seals the opening of the cup so that food and liquids do not escape the cup Examples of storage systems in accordance with the disclosure include a cylindrical cup with a concave rounded cut out on one side of the top ridge of the cup to facilitate maximum seal between the skin around the mouth and cup when receiving expelled food. This is the area of the cup that accepts expelled food for collection. In one embodiment of the lid, the lid fits into this rounded concave cut out in the cup ridge to seal off the cup. In another embodiment, the concave rounded cut out is cut out from the ridge of the lid. The lid may open with a lever system that opens the lid around the cup opening, allowing the food to eject into the cup and then close or seal off the cup, including the concave cut out part of the cup.

The techniques of the storage system are generally applicable to any type of food (solid or liquid). Also, although the examples described herein often refer to expulsion of food, the techniques described herein can also be used to expel, collect, and dispose of other materials. The concepts and techniques described may be applicable to any expulsion, collection, and disposal of material in a discrete fashion.

Also, although certain terms are used primarily herein, other terms could be used interchangeably to yield equivalent embodiments and examples. In addition, terms may have alternate spellings which may or may not be explicitly mentioned, and all such variations of terms are intended to be included.

Various embodiments may include some or a portion of the features and not others and may include additional features not described herein. Accordingly, various combinations are envisioned of any of the features presented in the accompanying drawings or described here.

For example, various ways are contemplated for obscuring the contents of the stored waste. In some examples of a storage system, the inside of the cup is colored dark, such as black or navy blue, to further obscure the contents inside the cup. The outside of the cup may be colored lighter to personalize the cup to the end user.

In some examples of a storage system, the cup has a rigid yet flexible guard (e.g., similar to a disposal sink guard in the kitchen) that allows food to fall into the bottom of the cup yet obscures and seals food from exiting from the bottom of the cup (towards the lid). For example, a cup and lid sealing and hiding system may include an inner material for obscuring food of a storage system. The inner material may be a rigid, yet flexible material such as plastic, cardboard, etc., and may sit inside the cup and be attached to the walls of the cup. The guard may be structured such that food falls through towards the bottom of the cup while hiding the food.

Some examples of a storage system further include a sealing system with a plastic bag at the bottom of the cup underneath that is brought up around the cup and twisted or folded and tied off at the top for sanitary seal and disposal. These bags may be constructed of plastic or other materials. This sealing system may be in the form of a lid cover over the cup opening.

Embodiments of the disclosure may have a lever. The lever raises a cover over an opening on top of the lid. The lever may be any shaped object (such as a square) that includes an arm that is depressible to activate (lift, slice, etc.) another object. The lever may be cantilevered, spring-loaded, and the like.

Embodiments of the disclosure may include a small protuberance near the opening portion of a lid with a sliding cover system. The sliding cover system exposes the cup opening and seals the cup opening.

Embodiments of the disclosure may include a lid opening and closing system with a button to expose and seal a cup opening. When the button is depressed, opening and closing system opens the cover on top of the cup opening via a hinge and arm system. The button may be any type of material, object, or shape that can be depressed to activate the cover (e.g., to lift, slide, open, tec.). The button may sit flush with the lid or cup.

Embodiments of the disclosure may include a manual opening system. The manual opening system may have ridges or manual thumb levers on either side of the lid and a hinge connecting the retractable portion of the lid to the static portion. In an example storage system, the lever may be a spring loaded or retractable lever.

Embodiments of the disclosure may include a drop and lever system. Levers are connected to a bar that wraps around the cup on one side and are connected to an external button on the outside of the storage system. A user presses the button to open/close the drop levers to allows food to descend into the cup.

Some examples of a storage system further include a series of folds at the top of the cup. The folds may fold over the opening of the lid to seal off the contents of the cup.

Some examples of a storage system include a lid that is attached to the cup and cannot be removed such as an integrated cup and lid. The integrated cup and lid may be used in either a reusable form or a nonreusable form of the storage system.

Some examples of a storage system include a bag that sits inside the cup to receive food matter. The bag may be made of material that is malleable and disposable such as a plastic product, or paper products or other materials. In some examples, the bag may also contain a powder or material to gelatinize and/or neutralize orders and liquified foods. The delivery mechanism of the neutralizing substance may be in one of multiple possible forms such as charged (i.e., static) to walls of the bag that dispense onto the food as food falls into the bag, exist passively at base of bag that mixes with food as food falls into bag, or a porous liner around the bag/cup that dispenses as food falls in much like a rosin bag dispenses powder when its tossed around or shaken.

Some examples of a storage system include a system to obscure the food in the opening of the cup. For example, embodiments of the disclosure may include a weighted arm system. The weighted arm system obscures food underneath the arms as arms extend out into the interior of the inside the cup. The arms may fall back against the walls of the cup when weight is added on top of the arms. Liquids may fall through the space between the arms. For example, in one storage system, two arms sit extended out from the sides of the inside of the cup. The arms on either side of the inside of the cup, are supported by a hinge-like mechanism that supports the arms. The hinge-like mechanisms are made of paper or thin flexible steel, plastic or cardboard material. When food falls on the arms the arms collapse under the weight of the food allowing the food to fall to the cup bottom. When the weight is gone then the arms snap back to horizontal position. Liquids are allowed to fall to the bottom of the cup by rounded notches at the ends of the arms that create a smaller opening between the arms for liquids. In a modification of the arm design, the arms do not completely touch one another allowing non solids to fall through to the cup bottom.

Other examples of a storage system include a lever outside the cup that controls a folder cover made of a flexible foldable material such as paper, light plastic, cardboard. For example, embodiments of the disclosure may include a curtain system. The curtain system is configured across the inside of the cup to cover food. The lever is pulled to draw back the curtain and the lever released to refold the curtain against the inside of the cup wall. More specifically, a lever outside the cup is moved one direction to pull a flattened, folded, horizontal curtain back against the wall of the inside of the cup. The lever is moved in the other direction to let the curtain fall back into place horizontally across the inside of the cup, to cover the food.

Other examples of a storage system include a bag like apparatus made of paper or cardboard that is attached around the outside of the cup. The bottom of the bag-like apparatus is secured (e.g., fastened, adhered, glued, attached, etc.) to an area of the cup below the top of the cup while the top part of the bag is loose around the cup top. The loose part of the bag can be brought up and over the top of the cup and lid to cover both (for example, extended over both) when the user is finished expelling material. The top of the bag, while extended above the cup and lid, can be brought together and both sides adjoined. The adjoined bag can then folded over (e.g., like a lunch bag) and tied off with a wire tie, string or similar device that is attached to the folded bag and tied off, twisted, or tapped down against the bag to secure the folds. For example, the wire ties, may extend past the edges of the sides or may be in line with the edges of the bag sides.

The lid of an example storage system may sit on top of, be inside of, or be attached (integrated, affixed, molded, etc.) to the opening of the cup. The cup and lid accept and hide food material deposited by the user into the cup through the lid.

In one example storage system, the lid contains an opening of typically rounded shape and size of the opening may vary. As described above, there may be a cover mechanism that seals the opening of the cup so that food and liquids do not escape the cup. For example, such covers may be controlled by one or more levers, a sliding cover, a button, a hinge, or the like.

A storage system lid is typically configured to be used with the cup that the lid was specifically designed to fit. Other variations of the lid design fit on top of or inside of the openings of cups. In one design of the lid and cup, the lid attaches to the cup via one or more interlocking ridge(s) alternately placed opposing to each other. The lid is seated on the cup and then twisted to interlock the ridge(s).

Embodiments of the disclosure may include opposing ridges for sealing. A user may twist the lid relative to the cup to create a seal. According to another design, the lid attaches and seals to the cup via a tongue and groove system.

Embodiments of the disclosure may include a ridge for sealing. A small ridge beneath the lid runs around the base of the cup. An indentation on the cup that runs around the top of the opening of the cup receives the ridge from the lid and insert together to seal the lid to the cup. Accordingly, a tongue of the lid inserts into the groove of the cup thereby interlocking the lid and the cup.

Embodiments of the disclosure may include a rounded opening that accepts food material. The rounded opening can be covered with a raise-able cover attached to a lever behind the cup opening cover that the user depresses. An arm attaches to the cover and is raised by a lever at the edge of the lid.

Embodiments of the disclosure the lid may have an opening that accepts food matter and a movable cover that slides from front to back of the lid exposing and covering a portion of the cup opening. The movable cover may move in ways other than sliding front to back and in other directions, such as movement by rotation, lifting/dropping to open/close, and the like. There may also be an open/close mechanism such as a lever on the side of the lid moves back and forth opening and closing the cover or a button, and the like. The lever may be constructed of a variety of materials including metal, rubber, plastic, and the like.

Embodiments of the disclosure may include a small protuberance (small extension such as a rounded extension) sits adjacent the opening portion of the lid that accepts food matter. The protuberance/extension may fit to the users mouth and lips so to cleanly accept food matter.

Embodiments of the disclosure may include a retractable cover over the cup opening. The cover retracts via a lever mechanism, that lifts the cover up off the opening to accept food. A button at the back of the lid is depressed to lift the cover. In another design a lever is used in lieu of a button.

In various example storage systems, the lid is attached to the cup in a non-removable fashion, i.e., not separable from the cup by the user under normal use. The lid is sealed onto the cup opening to prevent the removal of the lid from the cup. In one example storage system, the lid is sealed to the cup via a screwing mechanism where grooves on the cup and inside the lid lock onto each other thereby creating a seal. In another design variant, the lid interlocks via a series of ridges around the edge of the cup and inside the lid cover. Another variation includes a lid and cup attached to one another as a continuous piece of material such as with a type of cardboard or plastic. In another design variation, a lid screws on to the top of the cup with circular groves inside the lid and around the outside top part of the cup.

Embodiments of the disclosure may include a lid with a flexible and foldable opening to receive the food, which then falls into the cup. For example, a storage system may include a part flexible and part rigid material. A flexible lid is foldable back into itself and seals the cup. According to one design, the flexible portion of the lid attaches to the cup via a rigid plastic portion underneath the flexible lid portion that seals onto the cup via one the sealing methods described elsewhere herein. The flexible opening sits on top of the stiffer plastic underneath and presents an opening to the user to eject food material into. The user can open and close the flexible opening by folding the lid back into itself similar to how a milk carton may operate. The lid sits on top of the cup with a sealing system.

Various other examples of a storage system include a lid with a flexible snapping cover to seal the cup opening. A flexible arm attached to the back of the lid with the arm attached at the other end of the arm to a cover that snaps into the lid with a tongue and groove system. For example, a cup and lid sealing system of a storage system may include a cover that seals using a tongue and groove mechanism. A flexible arm is attached to the back of the lid with the arm attached at the other end of the arm to a cover. In one design, the cover snaps into the lid or locks into place using a tongue and groove system.

In various other examples of a storage system a rotating cover sits atop the lid. For example, a cover on a cup and lid sealing system of a storage system may rotate to open and close. An opening on the rotating cover matches the opening in the cup to accept food. A user twists (rotates) the cover one way to expose the cup opening and twists the cover in the opposite direction to close the cup opening. With the cover in the closed position the lid is now sealed.

The figures show embodiments that are in accordance with the disclosure. The embodiments of the figures may be combined and may include or be included within the features and embodiments described in the other figures of the application. The features and elements of the figures are, individually and as a combination, improvements to the technology storage systems. The various elements, systems, components, and steps shown in and by the figures may be omitted, repeated, combined, and/or altered as shown from the figures. Accordingly, the scope of the present disclosure should not be considered limited to the specific arrangements shown in the figures.

Turning to FIG. 1, the lid (100) is a base configuration used for a food storage system with the flanges (104) and (106) oriented perpendicular to the sides of the opening (102). The flanges (104) and (106) sit adjacent the opening (102) of the lid (100) and extend, perpendicular, some distance on the lid back towards the other side (e.g., the back side) of the lid (100). The flange system may run parallel from an edge of the cup a certain distance in a straight line towards the back of the lid (100). The flanges may vary in size and somewhat in shape depending on the size and shape of the lid (100). The flanges may substantially seal between the lid and a user's cheek area for privacy when expelling food. The lid (100) also includes the receptor extension (108) that extends past and away from a top edge of a cup to which the lid (100) is affixed. The lid (100) may be formed as a non-disposable lid that is formed from more durable material than a disposable lid and which may have an increased thickness. For example, the lid (100) may have a thickness between a top surface of the lid (100) and a bottom surface of the lid (100) that is greater than about 0.020 inches (or about 0.5 millimeters). In one embodiment, a thickness of the non-disposable lid is about 1 to 2 millimeters (about 0.040 to 0.080 inches).

Turning to FIG. 2.1, a front view of the lid (202) of the storage system (200) is illustrated. The lid (202) includes the side A (210) and the side B (214). The flange A (208) is on the side A (210) and the flange B (212) is on the side B (214). The flange A (208) is on a first side (210) (also referred to as a left side) of the lid (202) and protrudes up from the lid (202). The flange B (212) is on the side B (214) (also referred to as a right side) of the lid (200) and protrudes up from the lid (200). The side B (214) is opposite the side A (210).

Turning to FIG. 2.2, a left side view of the lid (202) of the storage system (200) is shown. The lid (202) includes the top surface (218). The lid (202) also includes the flange A (208).

Turning to FIG. 2.3, is a rear view of the lid (202) of the storage system (200) is shown. The lid (202) includes the open back (224). The open back (224) is formed by the distal portion A (220) and the distal portion B (222). The distal portion (220) is part of the flange A (208). The open back (224) may rise above the lip rest portion (242) with respect to the top of the cup onto which the lid (202) is attached. In one embodiment, the open back (224) may be lower than the lip rest portion (242) with respect to the top of the cup onto which the lid (202) is attached.

Turning to FIG. 2.4, a perspective view of the lid (202) of the storage system (200) is shown. The distal portion A (220) of the flange A (208) slopes down towards the cup (204) (see FIG. 2.9). The distal portion B (222) of the second flange slopes down towards the cup (see FIG. 2.9).

The ridge A (228) includes the distal portion A (220), the apex portion (226), the side portion A (230), and the proximal portion A (232). The ridge B (234) includes the distal portion B (222), the apex portion (236), the side portion B (238), and the proximal portion B (240). The ridge A (228), the ridge B (234) and the lip rest portion (242) form a continuous ridge around the lid (202).

The apex portion A (226) and the side portion A (230) of the ridge A (228) of the flange A (208) each have a convex curvature along the length of the ridge A (226). The distal portion A (220) of the ridge A (226) of the flange A (208) has a concave curvature along the length of the ridge A (226). The proximal portion A (232) of the ridge A (226) of the flange A (208) has a concave curvature along the length of the ridge A (226).

The apex portion B (236) and the side portion B (238) of the ridge B (234) of the flange B (212) each have a convex curvature along the length of the ridge B (234). The distal portion B (222) of the ridge B (234) of the flange B (212) has a concave curvature along the length of the ridge B (234). The proximal portion B (240) of the ridge B (234) of the flange B (212) has a concave curvature.

The apex portion A (226) of the flange A (208) is located closer to the distal end (244) of the lid than to the proximal end (246) of the lid (202). The apex portion B (236) of the second flange (212) is located closer to the distal end (244) of the lid (202) than to the proximal end (246) of the lid (202).

The apex portion A (226) and the side portion A (230) of the flange A (208) are formed closer to the center of the lid (202) than the proximal portion A (232). The apex portion B (236) and the side portion B (238) of the flange B (212) are formed closer to the center of the lid (202) than the proximal portion B (240).

The lip rest portion (242) of a continuous ridge of the lid (202) has a curvature along the a continuous ridge. The proximal portion A (232) of the continuous ridge and of the flange A (208) has a curvature that connects to and is different from the curvature of the lip rest portion. The proximal portion B (240) of the continuous ridge and of the flange B (212) has a curvature that also connects to and is different from the curvature of the lip rest portion (242). The curvature of the proximal portion B (240) may be symmetric to the curvature of the proximal portion A (232).

Turning to FIG. 2.5, a perspective view of the lid (202) of the storage system (200) is shown. The lid (202) includes the lip rest (216). The lip rest (216) is between the flange A (208) and the flange B (212).

Turning to FIG. 2.6, a top view of the lid (202) of the storage system (200) is shown. The inner surface (248) is part of the top surface (218) (see FIG. 2.2) of the lid (202). The inner surface (248) is at least partially concave. The outer surface (250) is part of the top surface (see FIG. 2.2) of the lid (202). The outer surface (250) is at least partially convex.

The side C (252) of the of the lid (202) is proximate to the lip rest (216) and between the side A (210) and the second side B (214). The side D of the lid (220) is distal to the lip rest (216), opposite the side C (252), and between the side A (210) and the side B (214). In one embodiment, the width of the opening (206) is about half or more of the diameter of the lid (202).

Turning to FIG. 2.7, a front cross sectional view of the lid (202) of the storage system (200) is shown. The cross section is shown from between the perspective arrows 2.7 of FIG. 2.6. The lid (202) includes the flange A (208) and the flange B (212).

Turning to FIG. 2.8, a side cross sectional view of the lid (202) of the storage system (200) is shown. The cross section is shown from between the perspective arrows 2.8 of FIG. 2.6. The lid (202) includes the flange B (212).

Turning to FIG. 2.9, a perspective view of the storage system (200) is shown. The storage system (200) includes the lid (202) and the cup (204). The opening (206) in the lid structured to pass material, expelled from a mouth of a user of the storage system (200), to the cup (204). The material may include solid food chewed by the user of the storage system (200).

Turning to FIG. 3.1, the storage system (300) includes the lid (302) and the cup (304). The lid (302) includes the door (306), the opening (307), the left flange (310), the right flange (312) and the lip rest region (308). The door (306) is secured to the lid and structured to movably cover the opening (307). The door (306) is in an open position.

Turning to FIG. 3.2, the storage system (300) includes the lid (302) with the door (306). The door (306) is in a closed position that covers the opening (307) (shown in FIG. 3.1) and the lip rest region (308).

Turning to FIG. 4.1, the lid (402) of the storage system (400) (of FIG. 4.2) is shown in a perspective view. The lid (402) includes the raised open back (450).

Turning to FIG. 4.2, the storage system (400) includes the lid (402) and the cup (404). The lid (402) may be formed as a disposable lid with a thickness between a top surface of the lid and a bottom surface of the lid less than about 0.020 inches (or about 0.5 millimeters).

Turning to FIG. 5.1, the lid (502) of the storage system (500) (of FIG. 5.2) is shown in a perspective view. The lid (502) includes the raised closed back (555). The raised closed back (555) is formed from a distal flange distal flange (520) protruding above and connecting to the flange A (522) and the flange B (524).

Turning to FIG. 5.2, the storage system (500) includes the lid (502) and the cup (504). The lid (502) may be formed as a disposable lid with a thickness between a top surface of the lid and a bottom surface of the lid less than about 0.020 inches (or about 0.5 millimeters) In one embodiment, a thickness of the disposable lid is about 0.010 inches (about 0.25 millimeters).

Turning to FIG. 6.1, the lid (602) includes the opening (606). The lid (602) is substantially flat.

Turning to FIG. 6.2, the lid (602) is substantially flush with a top end of the cup (604). The opening (606) is also substantially flush with a top end of the cup (604).

Turning to FIG. 7.1, the lid (702) includes the opening (706). The opening (706) sinks down from a top of the lid (702).

Turning to FIG. 7.2 the storage system (700) includes the lid (702) and the cup (704). The opening (706) may extend into the cup (704) below the lid (702).

Turning to FIGS. 8.1 and 8.2, the storage system (800) includes the lid (802) affixed to the cup (804). The lid (802) includes the door (806), which is rotatably attached. A spring between the lid (802) and the door (806) is biased to keep the door (806) closed. The storage system (800) may be configured with a thickness to be disposable and dispensed by a user after use during a single meal.

Turning to FIGS. 9.1 and 9.2, the storage system (900) includes the lid (902) affixed to the cup (904). The lid (902) includes the door (906), which is rotatably attached. A spring between the lid (902) and the door (906) is biased to keep the door (906) closed. The storage system (900) may be configured with a thickness to be disposable and dispensed with by a user after use during a single meal.

Turning to FIGS. 10.1 and 10.2, the storage system (1000) includes the lid (1002) affixed to the cup (1004). The lid (1002) includes the door (1006), which is slidably attached. The lid (1002) and the door (1006) may include energy storage components (e.g., springs, magnets, etc.) to bias the door (1006) to a closed position. The bias may temporarily be overcome by the user by tugging or applying frictional, levered, or similar force to the door (1006). Once that force is released, the bias reasserts itself. The storage system (1000) may be configured with a thickness to be disposable and dispensed with by a user after use during a single meal.

Turning to FIGS. 11.1 and 11.2, the storage system (1100) includes the lid (1102) affixed to the cup (1104). The lid (1102) includes the door (1106), which is pivotally attached. The lid (1102) and the door (1106) may include springs, catches, or bumps to bias the door (1106) to a closed position. The storage system (1100) may be configured with a thickness to be disposable and dispensed with by a user after use during a single meal.

Turning to FIGS. 12.1 and 12.2, the storage system (1200) includes the lid (1202) affixed to the cup (1204). The lid (1202) includes the door (1206), which is rotatably attached. Springs, magnets, etc., may connect between the lid (1202) and the door (1206) to bias the door (1206) to a closed position. The storage system (1200) may be configured with a thickness to be non-disposable and used during multiple meals.

Turning to FIGS. 13.1 and 13.2, the storage system (1300) includes the lid (1302) affixed to the cup (1304). The lid (1302) includes the door (1306), which is pivotally attached. Springs, magnets, etc., may connect between the lid (1302) and the door (1306) to bias the door (1306) to a closed position (see FIG. 13.2). The storage system (1300) may be configured with a thickness to be non-disposable and used during multiple meals.

Turning to FIG. 14, the storage system (1400) includes the lid (1402) affixed to the cup (1404). The lid (1402) includes the door (1406), which is slidably attached. Springs, magnets, bumps, catches, etc., may connect between the lid (1402) and the door (1406) to bias the door (1406) to a closed position. The storage system (1400) may be configured with a thickness to be non-disposable and used during multiple meals.

Turning to FIG. 15.1, the storage system (1500) includes the lid (1502) affixed to the cup (1504). The lid (1502) includes the door (1506), which is rotatably attached and connected to the lever (1508). The storage system (1500) may be configured with a thickness to be non-disposable and used during multiple meals.

Turning to FIG. 15.2, a side cross sectional view is shown of the storage system. The door (1506) may be attached to the lid (1502) with the lever (1508) (of FIG. 15.1). Operation of the lever (1508) (of FIG. 15.1) may manipulate the door (1506) to move to and between the closed position (1512) and the open position (1522). Springs, magnets, etc., may connect between the lid (1502) and the door (1506) to bias the door (1506) to the closed position (1512).

Turning to FIGS. 16.1 and 16.2, the storage system (1600) includes the lid (1602) affixed to the cup (1604). The lid (1602) includes the opening (1656) and a domed back (1658).

Turning to FIGS. 17.1 and 17.2, the storage system (1700) includes the lid (1702) affixed to the cup (1704). The lid (1702) may be removable or temporarily affixed, or may be permanently affixed as an all in one device with the cup (1704). In one embodiment, the lid (1702) may snap fit to the cup (1704). The lid (1702) includes the opening (1756) and a flat back (1758).

Turning to FIGS. 18.1 and 18.2, the storage system (1800) includes the lid (1802) affixed to the cup (1804). The cover (1872) is shaped to be removably attached to the lid (1802). In one embodiment, the cover (1872) may twist onto or snap onto the lid 1802.

Turning to FIGS. 19.1, 19.2, and 19.3, the storage system (1900) includes the lid (1902) affixed to the cup (1904). The lid (1902) is a twistable lid that may include a static portion, which does not rotate with respect to the cup (1904), and a rotator portion, which does rotate with respect to the cup (1904). Springs, magnets, etc., may bias the rotator portion to or between a closed position (FIG. 19.2) and an open position (see FIG. 19.3). The static portion of the lid (1902) includes a closed section (1908) (see FIG. 19.2)) and an open section (1910) (see FIG. 19.3) over which the opening (1906) of the lid (1902) rotates.

Turning to FIGS. 20.1, 20.2, and 20.3, the storage system (2000) includes the lid (2002) rotatably affixed to the cup (2004). The lid (2002) is a twistable lid that may include a static portion, which does not rotate with respect to the cup (2004), and a rotator portion, which does rotate with respect to the cup (2004). The opening (2006) may be rotated over the open section (2008) (see FIG. 20.2) and the closed section (2010) (See FIG. 20.3) of the static portion of the lid (2002). Springs, magnets, etc., may bias the rotator portion to or between a closed position (FIG. 20.2) and an open position (see FIG. 20.3). The lid (2002) includes the protrusions (2037) used to grip the lid (2002). The protrusions (2037) facilitate one handed operation of the storage system (2000). A user may hold the cup (2004) and use a digit (finger or thumb) to twist the lid (2002) using the protrusions (2037).

Figure 21:
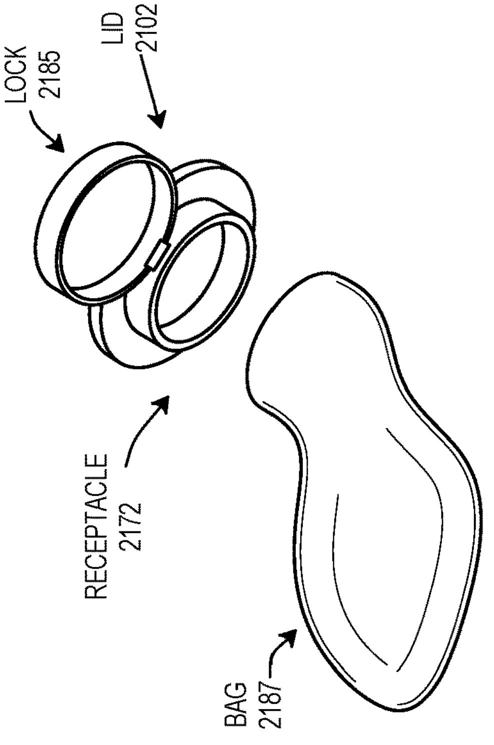
FIG. 21, FIG. 22, FIG. 23, and FIG. 24 show examples of bags used with storage systems in accordance with the disclosure.

Turning to FIG. 21, the lid (2102) is part of a storage system. The lid (2102) includes the receptacle (2172) onto which the header (2171) of the bag (2187) may fit. The lock (2185) to secures the bag (2187) to the receptacle (2172).

Figure 22:
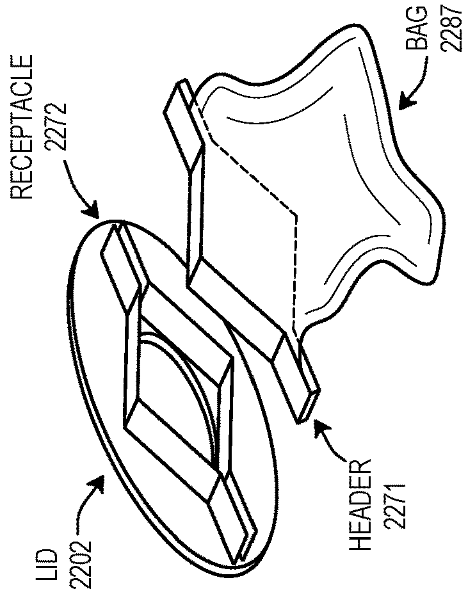

Turning to FIG. 22, the lid (2202) is part of a storage system. The lid (2202) includes the receptacle (2272) onto which the header (2271) of the bag (2287) may fit. The header (2271) may include supports (e.g., cardboard, plastic, etc.) that are shaped to fit to the receptacle (2272).

Figure 23:
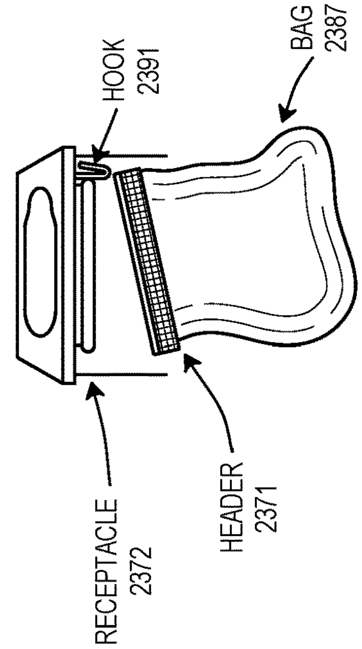

Turning to FIG. 23, the lid (2302) is part of a storage system. The receptacle (2372) is shaped to receive the bag (2387). The bag (2387) includes the header (2371) with an elastic portion to fit to the receptacle (2372). The receptacle (2372) is part of a lid that includes the hook (2391) that secures the bag (2387) to the receptacle (2372).

Figure 24:
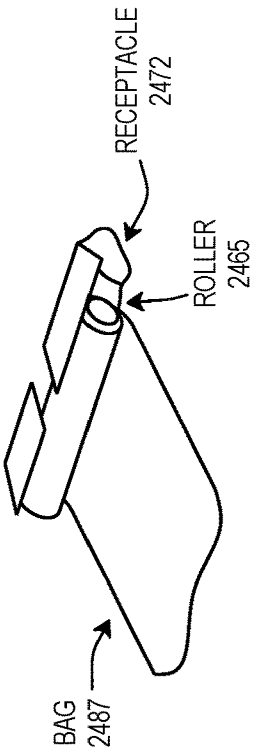

Turning to FIG. 24, the receptacle (2472) is part of a storage system. The receptacle (2472) includes the roller (2465) to which the bag (2487) is attached.

While the technology has been described with respect to a limited number of embodiments, those skilled in the art, having benefit of this disclosure, will appreciate that other embodiments may be devised which do not depart from the scope as disclosed herein. Accordingly, the scope of the technology should be limited only by the attached claims.

What is claimed is:

1. An apparatus comprising:
a lid;
a cup;
an opening in the lid structured to pass material, expelled from a mouth of a user of the apparatus, to the cup;
a first flange on a first side of the lid protruding up from the lid;
a second flange on a second side of the lid protruding up from the lid, wherein the second side is opposite the first side;
a lip rest between the first flange and the second flange;
a first apex portion of a first ridge of the first flange having a convex curvature of the first apex portion,
a first distal portion of the first ridge of the first flange having a concave curvature of the first distal portion; and
a first proximal portion of the first ridge of the first flange having a concave curvature of the first proximal portion;
a second apex portion of a second ridge of the second flange having a convex curvature of the second apex portion;
a second distal portion of the second ridge of the second flange having a concave curvature of the second distal portion; and
a second proximal portion of the second ridge of the second flange having a concave curvature of the second proximal portion.

2. The apparatus of claim 1, further comprising:
the first distal portion of the first flange sloping down towards the cup;
the second distal portion of the second flange sloping down towards the cup; and
an open back to the lid formed by the first distal portion and the second distal portion.

3. The apparatus of claim 1, wherein a width of the opening is about half or more of a diameter of the lid.

4. The apparatus of claim 1, further comprising:
the first apex portion of the first flange located closer to a distal end of the lid than to a proximal end of the lid; and
the second apex portion of the second flange located closer to the distal end of the lid than to the proximal end of the lid.

5. The apparatus of claim 1, further comprising:
the first apex portion and a first side portion of the first flange formed closer to a center of the lid than the first proximal portion; and
the second apex portion and a second side portion of the second flange formed closer to the center of the lid than the second proximal portion.

6. The apparatus of claim 1, further comprising:
a top surface of the lid;
an inner surface of the top surface of the lid, wherein the inner surface is at least partially concave; and
an outer surface of the top surface of the lid, wherein the outer surface is at least partially convex.

7. The apparatus of claim 1, further comprising:
a third side of the lid proximate to the lip rest and between the first side and the second side; and
a fourth side of the lid distal to the lip rest, opposite the third side, and between the first side and the second side.

8. The apparatus of claim 1, further comprising:
a lip rest portion of a continuous ridge having a first curve;
the first proximal portion of the continuous ridge and of the first flange having a second curve that connects to and is different from the first curve; and
the second proximal portion of the continuous ridge and of the second flange having a third curve that connects to and is different from the first curve, wherein the third curve is symmetric to the second curve.

9. The apparatus of claim 1, further comprising:
a door secured to the lid and structured to movably cover the opening.

10. The apparatus of claim 1, further comprising:
a distal flange protruding above and connecting to the first flange and the second flange.

11. The apparatus of claim 1, further comprising:
a receptor extension of the lip rest extending away from a top end of the cup.

12. The apparatus of claim 1, further comprising:
the lid formed as a disposable lid with a thickness between a top surface of the lid and a bottom surface of the lid less than about 0.020 inches.

13. The apparatus of claim 1, further comprising:
the lid formed as a non-disposable lid with a thickness between a top surface of the lid and a bottom surface of the lid greater than about 0.020 inches.

14. The apparatus of claim 1, further comprising:
the opening of the lid below a top end of the cup.

15. The apparatus of claim 1, wherein the material comprises solid food chewed by the user.

16. A storage system comprising:
a lid;
a cup;
an opening in the lid structured to pass material, expelled from a mouth of a user of the storage system, to the cup;
a first flange on a first side of the lid protruding up from the lid;
a second flange on a second side of the lid protruding up from the lid, wherein the second side is opposite the first side;
a lip rest between the first flange and the second flange;
a door configured to cover the opening; and
one or more energy storage components to bias the door to at least one of an open position and a closed position.

17. An apparatus comprising:
an opening in a lid structured to pass material, expelled from a mouth of a user of the apparatus, to a cup;
a first flange on a first side of the lid protruding up from the lid;
a second flange on a second side of the lid protruding up from the lid, wherein the second side is opposite the first side;

a lip rest between the first flange and the second flange;

a first apex portion of a first ridge of the first flange having a convex curvature of the first apex portion;

a first distal portion of the first ridge of the first flange having a concave curvature of the first distal portion; and a first proximal portion of the first ridge of the first flange having a concave curvature of the first proximal portion;

a second apex portion of a second ridge of the second flange having a convex curvature of the second apex portion;

a second distal portion of the second ridge of the second flange having a concave curvature of the second distal portion; and a second proximal portion of the second ridge of the second flange having a concave curvature of the second proximal portion.

* * * * *